United States Patent [19]

Prater

[11] Patent Number: 5,877,459
[45] Date of Patent: Mar. 2, 1999

[54] ELECTROSTATIC PEN APPARATUS AND METHOD HAVING AN ELECTRICALLY CONDUCTIVE AND FLEXIBLE TIP

[75] Inventor: James S. Prater, Fort Collins, Colo.

[73] Assignee: Hyundai Electronics America, Inc., San Jose, Calif.

[21] Appl. No.: 826,506

[22] Filed: Apr. 11, 1997

Related U.S. Application Data

[63] Continuation of Ser. No. 352,252, Dec. 8, 1994, abandoned.

[51] Int. Cl.$^6$ ..................................................... G08C 21/00
[52] U.S. Cl. .................................... 178/19.06; 178/19.01; 345/179
[58] Field of Search ............................... 178/18.2, 19.01, 178/19.06, 19.07; 345/179, 180, 181, 173, 174; 341/5, 23, 32; 364/709.1, 709.11, 709.01; 382/313, 314, 315

[56] References Cited

U.S. PATENT DOCUMENTS 5,138,118  8/1992  Russell ...................................... 178/19
5,357,062  10/1994  Rockwell et al. ......................... 178/18
5,440,080  8/1995  Nagaoka et al. .......................... 178/18
5,488,204  1/1996  Mead et al. ............................... 178/18

FOREIGN PATENT DOCUMENTS 615209  12/1994  European Pat. Off. ....... G06K 11/06

*Primary Examiner*—Paul Loomis
*Attorney, Agent, or Firm*—Townsend and Townsend and Crew LLP

[57] ABSTRACT

An electrostatic pen is disclosed wherein the pen's tablet engaging tip is both electrically conductive and flexible, thus providing an increasing tip contact area to a digitizing tablet as the tip of the manually held pen is pressed downward onto the tablet's top insulating layer. A signal source and signal detector are connected in series between the pen tip and the tablet's lower conductive layer. The increased contact area of the tip increases the capacitance between the tip and the tablet's lower conductive layer, thus improving the signal to noise ratio of the detected signal.

28 Claims, 3 Drawing Sheets

ELECTROSTATIC PEN APPARATUS AND METHOD HAVING AN ELECTRICALLY CONDUCTIVE AND FLEXIBLE TIP

This is a continuation of application Ser. No. 08/352,252 filed Dec. 8, 1994, now abandoned.

FIELD OF THE INVENTION

This invention relates to the field of a stylus or pen for interactive use with a digitizing tablet input device that is capable of producing signals that are usable by a signal detector such as a computer system.

BACKGROUND OF THE INVENTION

As is well known in the art of tablet type electrostatic digitizers, the signal that is generated by a signal source is coupled to the tablet by way of a capacitor whose components comprise the conductive pen tip, the tablet's upper insulator coating, and the tablet's lower conductive coating. Most of this capacitance effect is produced by a relatively small area of physical contact of the pen tip to the insulator coating. Generally speaking, the larger this contact area the larger will be the signal that is coupled to the tablet from the pen. With a rigid pen tip this capacitance is determined largely by the geometry of the pen tip, the geometry of the tablet, and the materials used in the pen tip and the tablet.

The art has provided graphics pens and the like whose tip or stylus is electrically conductive. U.S. Pat. No. 4,318,096 incorporated herein by reference is representative of this known feature of the art.

The general idea of providing a resilient contact pressure to a tablet is known. Reissue U.S. Pat. No. Re. 34,095 teaches a digitizer stylus having a tablet engaging pen refill of conventional pen refill construction. A pressure responsive transducer includes a movable plunger that is made of resilient material having a rounded surface that is deformed to increase the area of contact to a board as the stylus pressure increases.

While prior devices such as exemplified above are generally useful for their limited intended purposes, the need remains in the art for an electrostatic pen wherein the pen's tablet engaging tip is both electrically conductive and flexible, thus providing an increased capacitor-electrode contact area to a digitizing tablet as the tip is pressed down unto the tablet.

SUMMARY OF THE INVENTION

The present invention provides a manually operable electrostatic pen having a tapered tip or nib that is both electrically conductive and flexible.

In operation of the invention, a flexible pen tip deforms to increase the area of contact to a dielectric tablet, thus increasing the area of the top plate or electrode of the capacitor that is formed by the pen tip and the tablet.

An additional advantage of the use of a flexible tip is that the material from which the tip is formed can be selected to achieve a desired coefficient of friction between the pen and the tablet, thus improving the feel or tactile feedback of the pen while writing.

An object of the invention is to provide an apparatus and method for generating an electrical signal to a signal detector, such as a computer system, from a tablet and a manually movable touch pen that is operable with the tablet. The tablet includes a generally planar insulating layer having an upper surface and a lower surface. The lower surface of the insulating layer closely overlies a conductive layer. A touch pen is provided having a physically deformable, electrically conductive, and tapered tip for engaging the upper surface of the insulating layer. A signal source is provided having a first and a second signal conductor, the first signal conductor being connected to the electrically conductive tip, and the second signal conductor being adapted to be connected to the signal detector. An electrical conductor is connected to the conductive layer, this electrical conductor being adapted to be also connected to the signal detector.

As features of the invention the signal source is constructed integral with the pen body, the pen tip is an electrically conductive and deformable felt whose contact area to the upper surface of the insulating layer increases as a function of an increasing manual force pushing the tip down onto the upper surface of the insulating layer, and the electrical signal that is provided to the signal detector has a magnitude that increases as a function of increases in the tip contact area.

These and other objects, features and advantages of the invention will be apparent to those of skill in the art upon reference to the following detailed description, which description makes reference to the drawing.

DETAILED DESCRIPTION OF THE DRAWING

Figure 1:
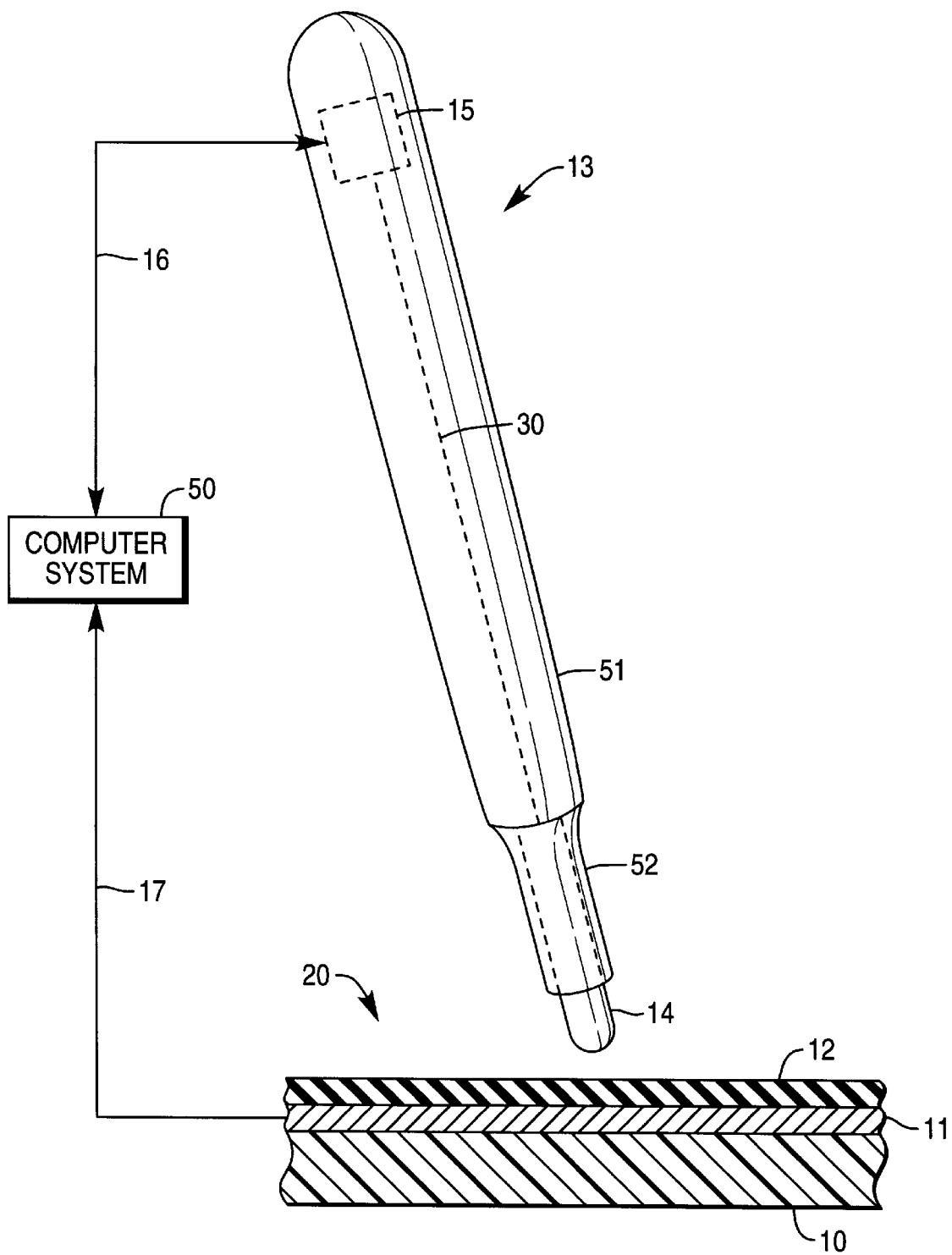
FIG. 1 is a side view of a digitizing tablet and a manually movable pen that are connected to a signal detector in accordance with the invention.

FIG. 1 is a side view of a digitizing tablet 20 and a manually movable pen 13 in accordance with the invention.

Tablet 20 defines a flat or planar and usually horizontal X-Y pixel coordinate system. The details of construction of tablet 20 are not critical to the invention and will not be described herein. It suffices to say that tablet 20 includes a base member 10 that provides structural stability and a flat or generally planar upper surface, an electrically conductive coating, layer or member 11 of generally uniform thickness that is supported on the upper surface of base member 10, and an electrically insulating coating, layer or member 12 of generally uniform thickness that is supported on the upper surface of conductive layer 11. Within the spirit and scope of the invention, insulating layer 12 can be positioned a small distance above conductive layer 11.

A first output conductor 17 extends from conductive coating 11 to a signal detector, for example a signal detector in the form of computer system 50. Other types of tablets may have an X-Y grid of electrodes or conductors, such as that described in U.S. Pat. No. 4,831,566 to Matthews et al., and which is hereby incorporated by reference. However, it should be noted that the actual conductor layout within the tablet is not critical to Applicant's invention described herein.

The details of construction of pen 13 in accordance with the invention are also not critical, with the exception that pen tip, stylus or nib 14 that extends downward from the bottom surface of insulating pen body 51 must be made of an electrically conductive, elastic, and flexible or deformable material. This tip 14 is usually surrounded by a metal or plastic barrel 52 to provide rigidity in the lateral direction, as is commonly done with felt tip ink pens. The overall dimensions of the pen tip are similar to that of conventional digitizing pens or conventional felt tip ink pens. A typical diameter of the pen tip is from 0.3 to 1.0 mm. Wider pen tips are also usable for lower resolution applications, and in those cases the rigid barrel may not be needed, as the flexible conductive tip becomes more rigid as its diameter increases. Many conductive elastomers are available for use as the pen tip material. One such material with good electrical and mechanical properties is available under the trade name "Velostat" from the 3M Corporation. Pen tip 14 is connected to a signal source 15 using standard known techniques. Preferably pen body 51 contains an internal signal source such as is shown at 15. Such internal signal sources are known in the art, as exemplified by U.S. Pat. No. 5,138,118 to Russell, and which is hereby incorporated by reference. The preferred signal is a sine wave having a frequency of between 50–150 Khz, and an amplitude of 30–100 Volts peak-to-peak.

Signal source 15 is connected to pen tip 14 by way of internal electrical conductor 30. A second output conductor 16 extends from signal source 15 to computer system 50. In an alternate embodiment, a wireless communication channel is provided in lieu of the second output conductor 16. This channel provides data and status information between the pen and computer system, as further described in the previously cited U.S. Pat. No. 5,138,118 to Russell.

As is well known, the signal that is generated by pen-contained signal source 15 is coupled to signal detector 50 by way of series circuit that includes the capacitor whose components comprise conductive pen tip 14, insulator coating 12, and conductive coating 11. Most of the capacitance effect 14,12,11 in this series circuit is produced by the small and variable size area 18 of physical contact of pen tip 14 to insulator layer 12 (see FIG. 4). Generally speaking, the larger this contact area 18 is, the larger magnitude will be the output signal 16,17 that is coupled from tablet 20 and pen 13 to associated computer system 50. When a rigid pen tip is provided in accordance with the prior art, the magnitude of this capacitance is determined largely by the geometry of the pen tip, the geometry of the tablet, and the materials used in the pen tip and the tablet.

Figure 2:
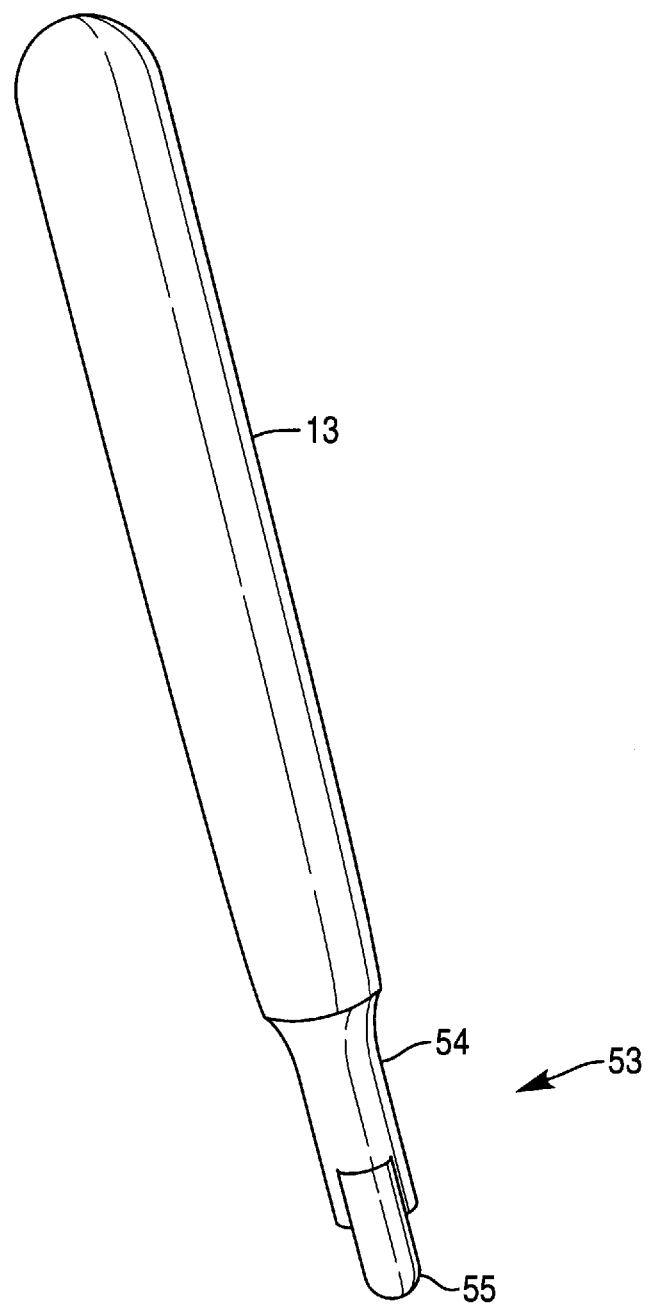
FIG. 2 is an alternate embodiment to that shown in FIG. 1, where the nib has a metal portion and a flexible portion.

FIG. 2 shows an alternate embodiment to that of FIG. 1. Instead of having a rigid barrel which surrounds and supports the flexible tip or nib 14, as shown in FIG. 1, there is instead a tip or nib 53 that comprises a metal or rigid portion 54 and a flexible portion 55. The flexible portion in made of the same material as element 14 of FIG. 1, but instead of being the entire nib/tip, it is instead affixed at the end of nib 53, and hence only comprises a portion of the tip/nib 53. The other, rigid portion 54 is made of metal, and provides a structural member for attaching the flexible portion 55 to pen/stylus body 13.

Figure 3:
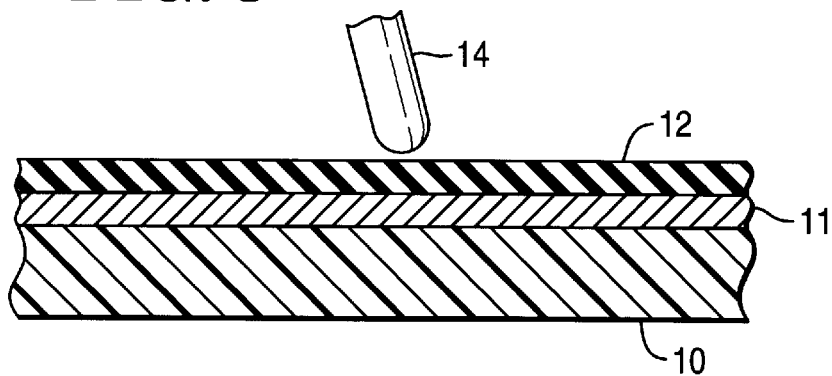
FIG. 3 is a side view similar to FIG. 1 showing the pen's tapered, electrically conductive, and flexible tip in a no-force engagement to the tablet.

FIG. 3 is a side view similar to FIG. 1 showing the pen's flexible tip 14 in a no-force, or minimal force, physical engagement to the upper surface of the tablet's top insulating layer 12. In this position of pen 13 the capacitance value of capacitor 14,12,10 is very low and the signal 16,17 that is provided to computer system 50 is of relatively low signal strength, thus having a low signal-to-noise ratio. This low signal-to-noise ratio results from the fact that a significant amount of ambient noise is 'picked-up' or received by the tablet 20, whose conductive layer 11 essentially acts as an antenna. It is thus difficult to discern signal 16,17 from this ambient noise.

Figure 4:
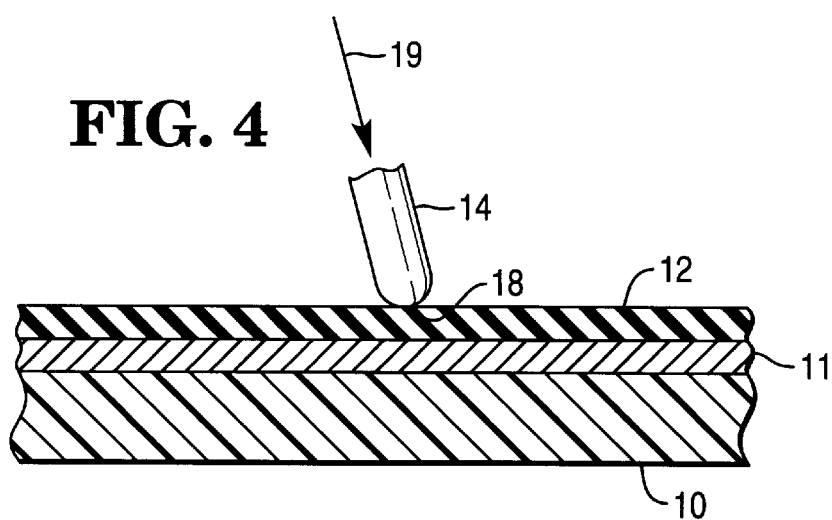
FIG. 4 is a side view similar to FIG. 3 showing deformation of the pen's tip by the application of a downward manual pressure, to thereby provide an increased contact area to the tablet and increased capacitance between the pen tip and the tablet.
Figure 5:
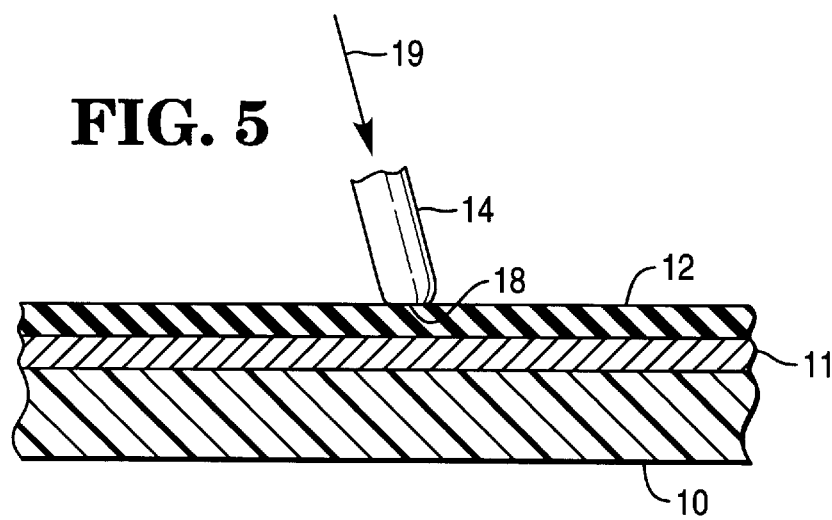
FIG. 5 is a side view similar to FIG. 4 showing further deformation of the pen's tip by the application of a downward manual pressure, to thereby provide an increased contact area to the tablet and increased capacitance between the pen tip and the tablet.

FIG. 4 is a side views similar to FIG. 3 showing deformation of the pen's felt tip 14 by the application of a downward manual force or pressure 19, to thereby provide an increased contact area 18 to tablet 20, and thereby increased capacitance between pen tip 14 and tablet 20. In this FIG. 4 position of pen 13, the capacitance value of capacitor 14,12,10 is much higher than that of FIG. 3, and therefore the signal 16,17 that is provided to computer system 50 is operable to provide a relatively higher magnitude pen position signal to signal detector 50. Thus, this signal has a higher signal-to-noise ratio than that of the signal generated by the pen position shown in FIG. 3. FIG. 5 provides an even higher signal-to-noise ratio than that of FIG. 4.

From the above description it can be seen that the invention provides an apparatus and a method for generating an electrical signal to detector 50 from tablet 20 and manually movable touch pen 13 wherein tablet 20 has an insulating layer 12 with an upper surface and a lower surface, the lower surface closely overlaying a conductive layer 11. Touch pen 13 has a physically deformable, electrically conductive, and tapered tip, preferably of electrically conductive elastomer, that is adapted to physically contact the top surface of insulating layer 12. A signal source 15, which is preferably integral with pen 13, has a first conductor or wireless channel 16 and a second conductor 30, the second conductor 30 being connected to electrically conductive tip 14, and the first conductor/channel 16 being adapted to be coupled to signal detector computer system 50. An electrical conductor 17 is connected to the tablet's conductive layer 11, this electrical conductor also being adapted to be connected to signal detector 50. Tip 14 deforms under variable magnitude force 19 to provide a variable size contact area 18 to the upper surface of insulating layer 12, this area increasing as a function of an increasing manual force 19 pushing tip 14 onto the upper surface of insulating layer 12. The signal that is provided to signal detector 50 increases in magnitude as a function of an increase in contact area 18 and the resulting increase in the capacitance value of capacitor 14,12,11.

While the invention has been described while making reference to preferred embodiments thereof, it is recognized that others skilled in the art will readily visualize other embodiments of the invention upon reading this detailed description. Thus, the forgoing detailed description is not to be taken as a limitation on the spirit and scope of the invention.

What is claimed is:

1. In combination:

a digitizing tablet; and a stylus having a compliant, single-piece tip that is electrically conductive, and means for generating an electrical signal.

2. The combination of claim 1 wherein said digitizing tablet comprises means for receiving said electrical signal.

3. A stylus comprising signal means for generating an electrical signal, said stylus having a compliant, uniform tip for radiating said electrical signal.

4. The stylus of claim 3 further comprising a rigid barrel that partially surrounds said tip.

5. An apparatus for improving a signal-to-noise ratio of an electrical signal received by a digitizing tablet, comprising:
   a stylus including signal means for generating said electrical signal, said stylus having a compliant, elastomeric contact area for radiating said electrical signal; and
   a receiver for receiving said radiated electrical signal.

6. The apparatus of claim 5 wherein said receiver is a digitizing tablet having a conductive layer therein.

7. A method for generating an electrical signal to a signal detector, comprising the steps of:
   providing a touch pen having an elastomeric and electrically conductive contact area for engaging an upper surface of an insulating layer; and
   providing a signal source having a first signal conductor, said first signal conductor being connected to said contact area.

8. The method of claim 7 wherein said signal source is integral with said pen and comprises a source of AC voltage between approximately 50–150 KHz.

9. The method of claim 7 wherein said contact area includes a carbon impregnated elastomer.

10. The method of claim 7 further comprising the step of providing a tablet having the insulating layer with the upper surface and a lower surface, said lower surface closely overlaying a conductive layer.

11. The method of claim 7 wherein said contact area increases as a function of increasing manual force onto said upper surface of said insulating layer, and including the step of providing an electrical signal to the signal detector whose magnitude increases as a function of increases in said contact area.

12. The method of claim 11 said contact area includes a carbon impregnated polyethelene.

13. The method of claim 12 wherein said signal source is integral with said pen.

14. The method of claim 13 further comprising the step of providing said signal source as an alternating current source of between approximately 50–150 KHz.

15. A method for receiving a variable strength signal by a tablet from a pen that is operable with said tablet, comprising the steps of:
   providing a pen including an elastomeric and conductive contact area;
   receiving a signal of a first signal strength by the tablet when the pen engages the tablet with a first force; and
   receiving a signal of a second signal strength by the tablet when the pen engages the tablet with a second force.

16. The method of claim 15 wherein the second signal strength is greater than the first signal strength when the second force is greater than the first force.

17. In combination:
   a signal detector;
   a tablet having a base member including a generally planar upper surface, a generally uniform thickness conductive coating overlaying said upper surface, and a generally uniform thickness insulating layer overlaying said conductive coating;
   a pen having a manually holdable pen body and a physically deformable, elastomeric and electrically conductive area of contact that is a function of the force by which said pen body is manually pressed down onto said insulating layer; and
   a signal source coupled to said area of contact.

18. The combination of claim 17 further comprising an electrical conductor connecting said conductive layer to said signal detector.

19. The combination of claim 17 wherein said area of contact is included in a tip that is formed of an electrically conductive elastomer.

20. The combination of claim 17 wherein said signal source is an AC source having a frequency in the range of about 50 KHz to about 150 KHz.

21. The combination of claim 17 wherein said signal source is integral with said pen body.

22. A pen for use with a dielectric tablet having an upper insulating layer, a lower conductive layer, and an electrical conductor connected to the conductive layer and adapted to connect the conductive layer to a signal detector, the pen comprising;
   a pen body having a lower end;
   an elastic, physically deformable, and electrically conductive area of contact that is a function of the force by which said pen body is manually pressed down onto the insulating layer; and
   a signal source coupled to said area of contact.

23. The pen of claim 22 wherein a pen tip of an electrically conductive elastomer includes the area of contact.

24. The pen of claim 22 wherein said signal source is an AC source having a frequency in the range of about 50 KHz to about –150 KHz.

25. The pen of claim 22 wherein said signal source is integral with said pen body.

26. A method for improving the signal to noise ratio of a detection signal that is provided to a digitizing tablet, the method comprising the step of:
   providing a pen having a tablet engaging contact area that is electrically conductive, elastomeric and flexible, thus providing a variable contact area to the tablet as the pen is pressed against the tablet with variable manual force.

27. The method of claim 26 further comprising the step of providing a signal source that is connected to the contact area, and a signal detector that is connected to a conductive layer of the tablet, wherein the increased contact area operates to increase the capacitance between the signal source and signal detector.

28. The method of claim 26 further comprising the step of providing a tapered tip of electrically conductive elastomer that includes the contact area.

* * * * *